United States Patent [19]

Maresca

[11] Patent Number: 4,544,705
[45] Date of Patent: Oct. 1, 1985

[54] AROMATIC POLYFORMALS

[75] Inventor: Louis M. Maresca, Belle Mead, N.J.

[73] Assignee: Union Carbide Corporation, Danbury, Conn.

[21] Appl. No.: 564,024

[22] Filed: Dec. 21, 1983

Related U.S. Application Data

[63] Continuation-in-part of Ser. No. 485,947, Apr. 18, 1983, abandoned.

[51] Int. Cl.[4] ............................................. C08G 65/40
[52] U.S. Cl. .................... 525/132; 525/150; 525/151; 525/436; 525/437; 525/439; 525/534; 525/535; 528/125; 528/126; 528/128; 528/174
[58] Field of Search ............... 528/174, 125, 126, 128; 525/132, 150, 151, 436, 437, 439, 534, 535

[56] References Cited

U.S. PATENT DOCUMENTS

| | | | |
|---|---|---|---|
| 3,069,386 | 12/1962 | Barclay, Jr. | 528/174 |
| 3,846,375 | 11/1974 | Wear | 528/174 |
| 4,163,833 | 8/1979 | Johnson | 528/174 |
| 4,260,733 | 4/1981 | Loucks et al. | 528/174 |
| 4,374,974 | 2/1983 | Hay | 528/174 |

FOREIGN PATENT DOCUMENTS 2738962  5/1978  Fed. Rep. of Germany .
2819582  9/1979  Fed. Rep. of Germany .

OTHER PUBLICATIONS

A. S. Hay et al., "Synthesis of New Aromatic Polyformals", 1982 Fall ACS Meeting, Kansas City, Missouri.

Primary Examiner—Lester L. Lee
Attorney, Agent, or Firm—Donald M. Papuga

[57] ABSTRACT

This invention is directed to novel aromatic polyformals comprising from about 5 weight percent to about 95 weight percent of repeating units (I) having the formula

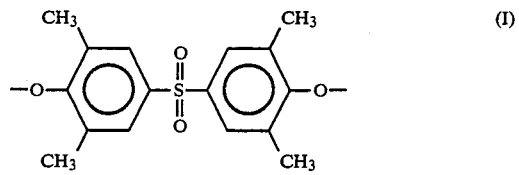

and from about 95 weight percent to about 5 weight percent of repeating units (II) having the formula

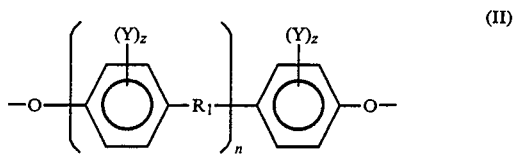

in which the repeating units (I) and the repeating units (II) are connected by interbonding units (III) having the formula

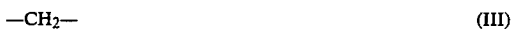

wherein Y is selected from alkyl groups of 1 to 4 carbon atoms, chlorine or bromine, each z, independently, has a value of from 0 to 4 inclusive, n has a value of 0 or 1, and $R_1$ is a divalent saturated or unsaturated hydrocarbon radical, O, CO, $SO_2$, S or a direct bond, with the proviso that when $R_1$ is $SO_2$ then repeating unit (II) is not the same as repeating unit (I). The invention is also directed to a process for preparing the novel aromatic polyformals. The aromatic polyformals have utility as molded plastic materials, adhesives, sealants and the like.

20 Claims, No Drawings

AROMATIC POLYFORMALS

BRIEF SUMMARY OF THE INVENTION

This application is a continuation-in-part of U.S. patent application Ser. No. 485,947, filed Apr. 18, 1983 and now abandoned.

TECHNICAL FIELD

The present invention is directed to novel aromatic polyformals and to the preparation thereof. The aromatic polyformals have utility as molded plastic materials, adhesives, sealants and the like.

BACKGROUND OF THE INVENTION

Polyformals based on Bisphenol A were first reported by Barclay U.S. Pat. No. 3,069,386. They were made by reaction of the anhydrous disodium salt of Bisphenol A with one equivalent of bromochloromethane in dimethyl sulfoxide. More recently, Hay, et al, in a recent presentation entitled "Synthesis of New Aromatic Polyformals", at the 1982 Fall ACS Meeting in Kansas City, Mo., addressed their manufacture.

German Often. No. 2,738,962, published May 11, 1978, based on U.S. application Ser. No. 739,562, filed Nov. 8, 1976, describes the manufacture of aromatic polyformal resins in which the units have the structure—OROCH$_2$—and wherein R is an arylene of 6 to 30 carbon atoms and the resin has an intrinsic viscosity of about 0.3 dl/g, measured in chloroform at 25° C. They are prepared specifically from Bisphenol A, an excess of methylene halides, and an alkali metal hydroxide.

German Often. No. 2,819,582, published Sept. 27, 1979, based on U.S. application Ser. No. 889,393, filed Mar. 23, 1978, describes flexible, film-forming polyformals having the repeating structure:

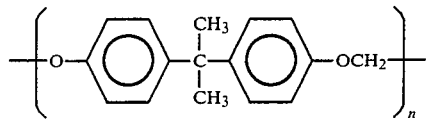

which are manufactured by the reaction of one mole of Bisphenol A and at least a stoichiometrically equivalent amount of methylene halide in the presence of at least a stoichiometrically equivalent amount of an alkali metal hydroxide and a phase transition catalyst, with or without a dipolar aprotic solvent. This patent publication appears to correspond to the Hay et al ACS publication.

One of the disadvantages with polyformals derived from 2,2-bis-(4-hydroxyphenyl)propane (Bisphenol A) and a methylene halide is their immiscibility with styrenic polymers, vinyl chloride containing polymers and the like. Polyformals miscible and compatible with styrenic polymers, vinyl chloride containing polymers and the like would be highly desirable for increasing heat distortion temperatures and therefore allowing for a broader range of end-use applications.

U.S. Pat. No. 4,374,974 describes polyformals prepared from a mixture containing a methylene halide, a bisphenol, an alkali metal hydroxide and a phase transfer catalyst or a dipolar aprotic solvent. Example 16 shows the preparation of a polyformal derived from bis-(3,5-dimethyl-4-hydroxyphenyl)sulfone (TMBS) and methylene bromide, which polyformal consists of chemically combined units of the formula

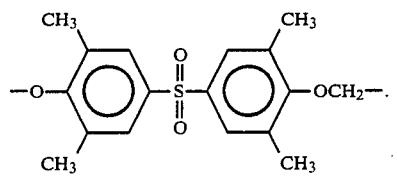

The polyformal is stated to be highly insoluble in non-polar organic solvents.

One of the problems with polyformals derived from bis-(3-5-dimethyl-4-hydroxyphenyl)sulfone (TMBS) and a methylene halide is their instability at required high processing temperatures. Another problem with polyformals derived from bis-(3,5-dimethyl-4-hydroxyphenyl)sulfone (TMBS) and a methylene halide is brittleness of molded articles prepared therefrom. Polyformals having good processability at high temperatures and providing improved toughness and ductility to molded articles prepared therefrom would be highly desirable.

DISCLOSURE OF THE INVENTION

The present invention is directed to novel aromatic polyformals which possess superior molding characteristics and physical properties. In particular, the present invention is directed to novel aromatic polyformals comprising from about 5 weight percent to about 95 weight percent of repeating units (I) having the formula

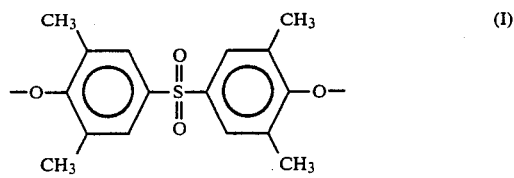

and from about 95 weight percent to about 5 weight percent of repeating units (II) having the formula

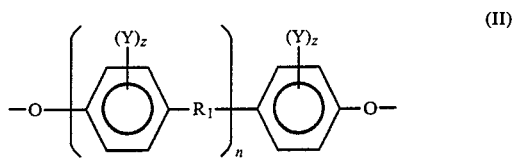

in which the repeating units (I) and the repeating units (II) are connected by interbonding units (III) having the formula

wherein Y is selected from alkyl groups of 1 to 4 carbon atoms, chlorine or bromine, each z, independently, has a value of from 0 to 4 inclusive, n has a value of 0 or 1, and R$_1$ is a divalent saturated or unsaturated hydrocarbon radical, particularly an alkylene or alkylidene radical having from 1 to 6 carbon atoms, or a cycloalkylidene or cycloalkylene radical having up to and including 9 carbon atoms, O, CO, SO$_2$, S or a direct bond, with the proviso that when R$_1$ is SO$_2$ then repeating unit (II) is not the same as repeating unit (I).

The novel aromatic polyformals of this invention can be terminated by end capping units (IV) having the formula

—OR$_2$ (IV)

bonded to the interbonding units (III) and/or end capping units (V) having the formula

—R$_3$ (V)

bonded to the repeating units (I) and/or (II), wherein R$_2$ and R$_3$ are monovalent organic alkyl radicals having from 1 to about 8 carbon atoms, cycloalkyl having from about 5 to about 10 carbon atoms, aryl containing not more than about 3 aromatic rings, and R$_3$ can further be an alkyl acyl, cycloalkyl acyl or aryl acyl radical.

The present invention is further directed to a process for preparing aromatic polyformals comprising from about 5 weight percent to about 95 weight percent of repeating units (I) having the formula

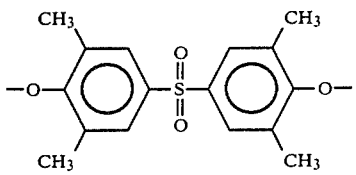
(I)

and from about 95 weight percent to about 5 weight percent of repeating units (II) having the formula

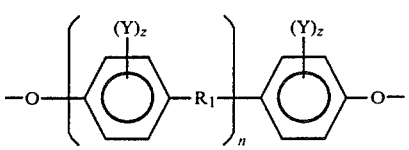
(II)

in which the repeating units (I) and the repeating units (II) are connected by interbonding units (III) having the formula

—CH$_2$— (III)

wherein Y is selected from alkyl groups of 1 to 4 carbon atoms, chlorine or bromine, each z, independently, has a value of from 0 to 4 inclusive, n has a value of 0 or 1, and R$_1$ is a divalent saturated or unsaturated hydrocarbon radical, particularly an alkylene or alkylidene radical having from 1 to 6 carbon atoms, or a cycloalkylidene or cycloalkylene radical having up to and including 9 carbon atoms, O, CO, SO$_2$, S or a direct bond, with the proviso that when R$_1$ is SO$_2$ then repeating unit (II) is not the same as repeating unit (I), which process comprises reacting the alkali or alkaline earth metal salts of repeating unit (I) and repeating unit (II) with at least one dihalomethane compound in amounts sufficient to form the aromatic polyformal.

The novel aromatic polyformals of this invention are exceptionally tough and ductile, exhibit a high degree of miscibility with styrenic polymers such as ABS, vinyl chloride containing polymers such as poly(vinyl chloride) PVC, and the like, and can be processed at high temperatures without causing instability problems especially for bis-(3,5-dimethyl-4-hydroxyphenyl)sulfone (TMBS).

DETAILED DESCRIPTION

This invention involves the manufacture of new aromatic polyformals by the interreaction of bisphenol compounds which give repeating units (I) and repeating units (II) having the formulas described above. Such bisphenol compounds include, for example, bis-(3,5-dimethyl-4 hydroxyphenyl)sulfone and 2,2-bis-(4-hydroxyphenyl)propane ("Bisphenol A") or bis-(4-hydroxyphenyl)sulfone, which are reacted in the amounts defined with a dihalomethane to produce the aforedescribed aromatic polyformals of this invention. More particularly the invention is achieved by the reaction of the aforementioned bisphenol compounds in the presence of an amount of an alkali metal base sufficient to theoretically form at least the dialkali metal salt of the aforementioned bisphenol compounds. Preferentially, the polymers are produced in the presence of a solvent for the monomers and the resulting polymer.

The reactant bis-(3,5-dimethyl-4-hydroxyphenyl)sulfone (TMBS) which gives repeating units (I) hereinabove can be prepared according to the process described in U.S. Pat. No. 3,383,421.

Suitable bisphenol compounds which give repeating units (II) having the formula described above, in addition to 2,2-bis-(4-hydroxyphenyl)propane (Bisphenol A) and bis-(4-hydroxyphenyl)sulfone, include hydroquinone, 4,4'-biphenol, bis-(4-hydroxyphenyl)methane, 2,2-bis(4-hydroxy-3-methylphenyl)propane, 4,4-bis-(4-hydroxyphenyl)heptane, 2,2-bis-(3,5-dichloro-4-hydroxyphenyl)propane, 2,2-bis-(3,5-dibromo-4-hydroxyphenyl)propane, and bis-(3-chloro-4-hydroxyphenyl)methane. Other bisphenol compounds are also available and are disclosed in U.S. Pat. Nos. 2,999,835, 3,028,365 and 3,334,154.

Any dihalomethane which gives interbonding units (III) hereinabove may be reacted with the above-described dihydric phenol salts which give repeating units (I) and (II) hereinabove to produce the polyformals of this invention. Such dihalomethane are not restricted to those containing only a single halide specie, but also includes those containing two different species such as chlorobromomethane. The preferred dihalomethane for use in this invention is dichloromethane.

The polymers of this invention can be formed in a number of ways. The methods which are employable can generally be classified as either a two-step process or a one-step process.

The two-step process involves a first step of reacting slightly less than a molar equivalent of dihalomethane with the hydrated disodium or dipotassium salt(s) of bis-(3,5-dimethyl-4-hydroxyphenyl)sulfone with bisphenol compounds which give repeating units (II) having the formula described above, for example, Bisphenol A and/or bis(4-hydroxyphenyl)sulfone, in the proportions desired, in a highly polar solvent such as a dimethylsulfoxide, then adding an azeotropic solvent, such as benzene or toluene, with a small amount of a base and, finally, dehydrating by azeotropic distillation. In the second step another portion of dihalomethane is added to give a slight excess, about 1 to 5%, over stoichiometry which on reaction causes marked increase in the viscosity of the polymer. It is believed that the excess amount of dihalomethane is required to make up for hydrolysis of the polymer or evaporation losses of dihalomethane during the manufacture of the polymer. In the first step a low molecular weight polymer is formed, termed herein an "oligomer", and the second step advances the polymerization of the oligomer by reaction of the oligomer with dihalomethane.

The one-step approach involves mixing the polar solvent and the salt of the bisphenols, as aforedescribed, to form a solution and dehydrating the solution before the addition of the dihalomethane. This one-step process is advantageous in that an excess of dihalomethane is not essential for high molecular weight polymer formation. The polymers made in this manner are invaribly thermally stable, whereas polymers made by the two-step process may, with the application of heat, increase in molecular weight or even partially gel, presumably as a result of side-reactions of by-product methylol groups.

Another method which can be employed in preparing the aromatic polyformals of this invention involves mixing and heating in the polar solvent the bisphenols, essentially 2 equivalents of an alkali and/or alkaline earth metal hydroxide and a large excess of the dihalomethane compound as aforedescribd in the absence of an azeotropic solvent.

The terminal units of the polymer, $-O-R_2$ and $-R_3$, are formed by the addition of chain stoppers that are mono-hydroxy organic compounds, mono-halogenated organic compounds and/or organic acyl compounds, respectively, to the reaction mixture. Examples of suitable mono-hydroxy compounds are hydroxy-aromatics such as phenol, cresol and the like. Examples of suitable mono-halogenated organic compounds include mono-halo-alkanes such as methyl chloride, chloroethane, isopropyl chloride, methyl bromide, cyclohexyl chloride and the like, and mono-halo-alkyl-aromatics such as benzyl chloride, benzyl bromide, and the like, and alkyl or aromatic acyl halides such as acetyl chloride, benzoyl chloride and the like.

The polyformals of this invention can have high molecular weight, indeed, molecular weights characterized by a reduced viscosity, of at least about 0.2 dl/g as determined in chloroform at 25° C. (0.5 gram per 100 cc).

The process of this invention is carried out in the presence of highly dipolar solvents, such as dimethylsulfoxide (DMSO), dimethylformamide (DMF), dimethylacetamide (DMAC), N-methyl-2-pyrrolidone (NMP), dimethylsulphone, diphenylsulfone, sulfolane(-tetramethylenesulfone), glycol ethers such as diglyme, triglyme, tetraglyme, and the like, and arylethers, such as diphenylether.

Dihalomethanes, such as methylene chloride, react rapidly in the aforementioned solvents, in particular in dimethylsulfoxide, with the salts of the bisphenols, bis-(3,5-dimethyl-4-hydroxyphenyl)sulfone and with bisphenol compounds which give repeating units (II) having the formula described above, for example, 2,2-(4-hydroxyphenyl)propane and/or bis-(4-hydroxyphenyl)-sulfone, to readily achieve high molecular weight polyformals. The salt form of the bisphenols can be that of any of the alkali metals or alkaline earth metals, for example, sodium, potassium, cesium, and rubidium, calcium, magnesium, and the like. The alkali metal salts are the most preferred.

The temperature of the reaction is not critical, although temperatures of at least about 25° C. are believed desirable to achieve any appreciable reaction. To achieve a reaction within a commercially reasonable period of time, a temperature of at least 50° C. is desirable. Generally, temperatures of at least 60°-70° C. are employed for polymer formation. It is oftentimes desirable to operate the polymerization reaction over a temperature varient which is commensurate with the degree of polymerization sought. Thus, as higher molecular weight polymers are desired, the temperature can be ever increased to achieve the same.

One of the problems with increasing temperature, of course, stems from the degradation of the solvent at those temperatures. In the preferred embodiment, a solvent which is stable at the reaction temperatures employed is used. However, should the solvent not be as stable as one desires at the temperature required to achieve the desired molecular weight, then a second and more heat stable solvent or polymer solvating agent should be added. For example, in this way, one can start with a relatively active but thermally unstable solvent for low molecular weight polymerization, introduce a second solvent which is less active at the initial temperature but has a better stability at higher temperatures, to advance the molecular weight to the desired level. Indeed a third solvent can be introduced which is even higher boiling and more stable than the second solvent in order to maximize the level of polymer molecular weight formation. Illustrative is the solvent sequence of dimethylsulfoxide, followed by sulfolane, followed by diphenylsulfone or diphenylether, and the like.

In some instances, the molecular weight may not be obtainable by actually redissolving the polymer. The same aforementioned solvents can be used for the same purpose by solvating the polymer, that is swelling it sufficiently without actually dissolving it to allow the polymer to react further, at higher temperatures, and thereby advance in molecular weight.

The process pressures are not narrowly critical. Pressures ranging from subatmospheric to superatomspheric pressures are employable.

The reaction between the reactants which give repeating units (I) hereinabove, repeating units (II) hereinabove and interbonding units (III) hereinabove proceeds on a stoichiometric basis such that the desired polyformal is formed. Stoichiometry is not critical and the only requirement is that the amounts of dihalomethane and alkali metal salts of the bisphenols employed are sufficient to form the polyformal. By varying the ratio of bis-(3,5-dimethyl-4-hyroxyphenyl)sulfone (TMBS) to bisphenol derived from structural formula (II) hereinabove, one can vary the polyformal polymer ultimately produced and its properties. The aromatic polyformals of this invention contain from about 5 weight percent to about 95 weight percent of repeating units (I) hereinabove, preferably from about 25 weight percent to about 75 weight percent, and most preferably from about 40 weight percent to about 60 weight percent. The aromatic polyformals of this invention contain from about 95 weight percent to about 5 weight percent of repeating units (II) hereinabove, preferably from about 75 weight percent to about 25 weight percent, and most preferably from about 60 weight percent to about 40 weight percent.

The structure of the polyformal polymers of this invention can be modified to some extent by including in the polymerization reaction other dihydroxy compounds, typically not more than 10 weight percent of the total weight of the repeating units (I) and (II) in the polyformal. For example, one might include along with Bisphenol A and bis-(3,5-dimethyl-4-hydroxyphenyl)-sulfone (TMBS), other dihydroxy compounds either as such or in the haloformate form, as a partial substitute and modifier of the polymeric structure, without adversely affecting the overall properties of the polymeric structure of this invention. For example, such dihydroxy compounds as ethylene glycol, propylene glycol, 1,4-butylene glycol, and the like can be included in the polymerization reactions to manufacture the polyformal polymers of this invention.

Polymer recovery can be achieved by processes well known in the art to recover a moldable polyformals that will exhibit excellent miscibility and processing stability.

In addition, the polyformals of this invention exhibit excellent compatibility with the polyethersulfones such as those which are described in U.S. Pat. No. 3,264,536 and U.S. Pat. No. 4,175,175, as well as with other poly(aryl ether)s, poly(ester-carbonate)s, polyarylates, polyesters, polycarbonates, poly(ether imide)s, styrenic polymers, vinyl chloride containing polymers and the like.

The molecular weight of these polyformal polymers is indicated by reduced viscosity in indicated solvents. As well understood in the art, the viscosity of a resin solution bears a direct relationship to the weight average molecular weight of the polymer chains, and is the most important single property that can be used to characterize the degree of polymerization. The reduced viscosity assigned to the polymer masses of the present invention is therefore to be understood as significant in reflecting molecular weight rather than consideration concerning the viscosity per se. Most of these polyformal polymers have indicated ready solubility in N-methyl-2-pyrrolidone (NMP), chloroform, or tetrachloroethane or other similar solvent.

Reduced viscosity (R.V.) as used herein was determined by dissolving a 0.5 gram sample of polyformal polymer in the indicated solvent, i.e., chloroform, contained in a 100 milliliter volumetric flask so that the resultant solution measured exactly 100 milliliters at 25° C. in a constant temperature bath. The viscosity of 3 milliters of the solution which had been filtered through a sintered glass funnel was determined in an Ostwald or similar type viscometer at 25° C. Reduced viscosity values were obtained from the equation:

$$\text{Reduced Viscosity} = \frac{t_s - t_o}{C \cdot t_o}$$

wherein:
 $t_o$ is the efflux time of the pure solvent;
 $t_s$ is the efflux time of the polymer solution; and
 C is the concentration of the polymer solution expressed in terms of grams of polymer per 100 milliliters of solution.

The polyformals of this invention are characterized as thermoplastic structures which have a relatively high molecular weight, that is, a reduced viscosity detrmined at 25° C. in chloroform of at least 0.3 dl/g, preferably at leat 0.5 dl/g and, typically not exceeding about 1.5 dl/g. These polymers are exceptionally tough and ductile, exhibit a high degree of miscibility with styrenic polymers, vinyl chloride containing polymers and the like, and can be processed at high temperatures without causing instability problems especially for bis-(3,5-dimethyl-4-hydroxyphenyl)sulfone (TMBS).

The molded blend compositions prepared in the examples below were evaluated according to the following procedures:

| | |
|---|---|
| 1% Secant Modulus (psi): | ASTM D-638; |
| Tensile Strength (psi): | ASTM D-638; |
| Elongation at Break (%): | ASTM D-638; |

Pendulum Impact Strength (ft.lbs/in$^3$): A steel pendulum is used, cylindrical in shape with a diameter of 0.83 inch and weighing 1.562 pounds; the striking piece, mounted almost at the top of the pendulum is a cylinder 0.3 inch in diameter; film specimens, 4 inches long, 0.125 inch wide and about 1 to 30 mls thick are clamped between the jaws of the tester so that the jaws are spaced 1 inch apart; the 0.125 inch width of the film is mounted vertically; the pendulum is raised to a constant height to deliver 1.13 foot pounds at the specimen; when the pendulum is released the cylindrical striking piece hits the specimen with its flat end, breaks the film, and travels to a measured height beyond; the difference in the recovery height (i.e., the difference in the potential energy of the pendulum at the maximum point of the upswing) represents the energy absorbed by the specimen during the rupture; the impact strength, expressed in foot-pounds per cubic inch, is obtained by dividing the pendulum energy loss by the volume of the specimen.

Although this invention has been described with respect to a number of details, it is not intended that this invention should be limited thereby. The examples which follow are intended solely to illustrate the embodiments of this invention which to date have been determined and are not intended in any way to limit the scope and intent of this invention.

COMPARATIVE EXAMPLE A

Into a 250 milliliter flask equipped with a mechanical stirrer, reflux condenser and nitrogen inlet was charged 45.90 grams (0.15 moles) of bis-(3,5-dimethyl-4-hydroxyphenyl)sulfone (TMBS), 50 milliliters of methylene chloride, and 70 milliliters of N-methyl-2-pyrrolidone (NMP). The mixture was stirred under nitrogen until a homogeneous solution was obtained. At this point 12.86 grams (0.31 moles) of 97% sodium hydroxide pellets were added. The resulting mixture was stirred at room temperature for 1 hour and then heated to 70° C. A heavy white precipitate formed after 1 hour. The viscous mixture was diluted with 50 milliliters of NMP and heated to 100° C. After 24 hours at 100° C. the reaction was diluted with 148 milliliters of chlorobenzene, cooled to room temperature and then filtered. The resulting polymer was isolated by coagulation in methanol and then dried in a vacuum oven overnight at 60° C. Its reduced viscosity in 0.5% chloroform solution at 25° C. was 0.30 dl/g.

COMPARATIVE EXAMPLE B

Into a 250 milliliter 3-necked round bottom flask equipped with a mechanical stirrer, reflux condenser and nitrogen inlet was charged 34.25 grams (0.15 moles) of 2,2-bis-(4-hydroxyphenyl)propane (Bisphenol A), 127.50 grams (1.5 moles) of methylene chloride, 12.99 grams (0.32 moles) of 97% sodium hydroxide pellets, and 140.50 grams of N-methyl-2-pyrrolidone (NMP). The mixture was heated under a nitrogen atmosphere at a temperature of 75° C. for a period of 5 hours. After this reaction period, the resulting solution was diluted with 200 milliliters of N-methyl-2-pyrrolidone (NMP), cooled to room temperature and filtered. The resulting polymer was isolated by coagulation in methanol and then dried in a vacuum oven overnight at 60° C. Its reduced viscosity in 0.5% chloroform solution at 25° C. was 0.42 dl/g.

COMPARATIVE EXAMPLE C

A polymer having repeating units derived from 2,2-bis-(4-hydroxyphenyl)propane (Bisphenol A) and interbonding units derived from methylene chloride was prepared in a manner similar to Comparative Example B. The polymer had a reduced viscosity in 0.5% chloroform solution at 25° C. of 1.10 dl/g.

EXAMPLE 1

Into a 250 milliliter 3-necked round bottom flask equipped with a mechanical stirrer, reflux condenser and nitrogen inlet was charged 22.95 grams (0.075 moles) of bis-(3,5-dimethyl-4-hydroxyphenyl)sulfone (TMBS), 17.13 grams (0.075 moles) of 2,2-bis-(4-hydroxyphenyl)propane (Bisphenol A), 127.50 grams (1.5 moles) of methylene chloride, 12.99 grams (0.32 moles) of 97% sodium hydroxide pellets, and 140.50 grams of N-methyl-2-pyrrolidone (NMP). The mixture was heated under a nitrogen atmosphere at a temperature of about 80° C. for a period of 15 hours. After this reaction period, the resulting solution was diluted with 200 milliliters of N-methyl-2-pyrrolidone (NMP), cooled to room temperature and filtered. The resulting polymer was isolated by coagulation in methanol and then dried in a vacuum oven overnight at 60° C. Its reduced viscosity in 0.5% chloroform solution at 25° C. was 0.68 dl/g.

COMPARATIVE EXAMPLE D

A sample of the bis-(3,5-dimethyl-4-hydroxyphenyl)-sulfone (TMBS) polyformal prepared in Comparative Example A was compression molded into a plaque in a 4 inch × 0.020 inch cavity mold at about 250° C. using a South Bend hydraulic press with heated jaws. No mechanical properties could be determined because of brittleness of the molded product. However, the glass transition temperature (Tg) of the sample was measured on a DuPont 990 Thermal Analyzer equipped with a DSC pressure cell. The scanning rate was 10° C./minute and the measured Tg was 170° C.

COMPARATIVE EXAMPLE E

A sample of the Bisphenol A polyformal prepared in Comparative Example C was compression molded into a plaque in a 4 inch × 4 inch × 0.020 inch cavity mold at about 200° C. using a South Bend hydraulic press with heated jaws. The resultant molded product was determined to have a glass transition temperature (Tg) of 90° C. by the resilience minimum technique using modulus-temperature data and resilience-temperature data as described in "Polymer-Polymer Miscibility", Olabisi et al., p. 122-126, Academic Press, New York, 1979. The resultant molded product (plaque) was also tested for the mechanical properties described in Table I hereinbelow and the results of such testing are given in Table I.

EXAMPLE 2

A sample of the TMBS/Bisphenol A polyformal prepared in Example 1 was compression molded into a plaque in a 4 inch × 4 inch × 0.020 inch cavity mold at about 200° C. using a South Bend hydraulic press with heated jaws. The resultant molded product was determined to have a glass transition temperature (Tg) of 125° C. by the resilience minimum technique using modulus-temperature data and resilience-temperature data as described in "Polymer-Polymer Miscibility", Olabisi et al., p. 122-126, Academic Press, New York, 1979. The resultant molded product (plaque) was also tested for the mechanical properties described in Table I hereinbelow and the results of such testing are given in Table I. The glass transition temperature (Tg) of TMBS/Bisphenol A polyformal is significantly higher than the glass transition temperature (Tg) of Bisphenol A polyformal (see Comparative Example E), therefore allowing for a broader range of higher temperature end-use applications.

COMPARATIVE EXAMPLE F

A sample of styrene/acrylonitrile copolymer (24% acrylonitrile) available from Union Carbide Corporation, Danbury, Conn. as RMD 4400 was compression molded into a plaque in a 4 inch × 4 inch × 0.020 inch cavity mold at about 200° C. using a South Bend hydraulic press with heated jaws. The resultant molded product was determined to have a glass transition temperature (Tg) of 100° C. by the resilience minimum technique using modulus-temperature data and resilience-temperature data as described in "Polymer-Polymer Miscibility", Olabisi et al., p. 122-126, Academic Press, New York, 1979. The resultant molded product (plaque) was also tested for the mechanical properties described in Table I hereinbelow and the results of such testing are given in Table I.

COMPARATIVE EXAMPLE G

A sample of styrene/acrylonitrile copolymer (28% acrylonitrile) available from Union Carbide Corporation, Danbury, Conn. as RMD 4511 was compression molded into a plaque in a 4 inch × 4 inch × 0.020 inch cavity mold at about 200° C. using a South Bend hydraulic press with heated jaws. The resultant molded product was determined to have a glass transition temperature (Tg) of 100° C. by the resilience minimum technique using modulus-temperature data and resilience-temperature data as described in "Polymer-Polymer Miscibility", Olabisi et al., p. 122-126, Academic Press, New York, 1979. The resultant molded product (plaque) was also tested for the mechanical properties described in Table I hereinbelow and the results of such testing are given in Table I.

COMPARATIVE EXAMPLE H

A sample of poly(vinyl chloride) PVC available from Union Carbide Corporation, Danbury, Conn. as QYSA was compression molded into a plaque in a 4 inch × 4 inch × 0.020 inch cavity mold at about 180° C. using a South Bend hydraulic press with heated jaws. The resultant molded product was determined to have a glass transition temperature (Tg) of 80° C. by the resilience minimum technique using modulus-temperature data and resilience-temperature data as described in "Polymer-Polymer Miscibility", Olabisi et al., p. 122-126, Academic Press, New York, 1979. The resultant molded product (plaque) was also tested for the mechanical properties described in Table I hereinbelow and the results of such testing are given in Table I.

COMPARATIVE EXAMPLE I

A blend of 5 grams of the styrene/acrylonitrile copolymer (24% acrylonitrile) used in Comparative Example F and 5 grams of the Bisphenol A polyformal described in Comparative Example B was prepared in chloroform. The resulting solution was cloudy and a thin film cast from the solution was opaque. The solution was then devolatilized in a vacuum oven and the resulting solid product was dried under vacuum at about 100° C. to constant weight. The solid product was then compression molded into a plaque in a 4 inch×4 inch×0.020 inch cavity mold at about 200° C. The resulting molded product exhibited obvious phase separation as evidenced by the fact that the molded product was opaque. The molded product was thereafter tested for miscibility by the resilience minimum technique using modulus-temperature data and resilience-temperature data as described in "Polymer-Polymer Miscibility", Olabisi et al., p. 122–126, Academic Press, New York, 1979. The modulus-temperature data and resilience-temperature data show that the molded product prepared from the blend of Bisphenol A polyformal and styrene/acrylonitrile copolymer had two glass transition temperatures (Tg) of 80° C. and 100° C. The styrene/acrylonitrile copolymer had a glass transition temperature of 100° C. using the same resilience minimum technique. These results clearly demonstrate that Bishpenol A polyformal exhibits a very low level of miscibility with styrene/acrylonitrile copolymer (24% acrylonitrile) and therefore, does not act as a heat distortion builder for styrene/acrylonitrile copolymer as evidenced by essentially no increase in glass transition temperature (Tg) of the styrene/acrylonitrile copolymer.

COMPARATIVE EXAMPLE J

A blend of 5 grams of the styrene/acrylonitrile copolymer (28% acrylonitrile) used in Comparative Example G and 5 grams of the Bisphenol A polyformal described in Comparative Example B was prepared in chloroform. The resulting solution was cloudy and a thin film cast from the solution was opaque. The solution was then devolatilized in a vacuum oven and the resulting solid product was dried under vacuum at about 100° C. to constant weight. The solid product was then compression molded into a plaque in a 4 inch×4 inch×0.020 inch cavity mold at about 200° C. The resulting molded product exhibited obvious phase separation as evidenced by the fact that the molded product was opaque. The molded product was thereafter tested for miscibility by the resilience minimum technique using modulus-temperature data and resilience-temperature data as described in "Polymer-Polymer Miscibility", Olabisi et al., p. 122–126, Academic Press, New York, 1979. The modulus-temperature data and resilience-temperature data show that the molded product prepared from the blend of Bisphenol A polyformal and styrene/acrylonitrile copolymer had two glass transition temperatures (Tg) of 80° C. and 100° C. The styrene/acrylonitrile copolymer had a glass transition temperature of 100° C. using the same resilience minimum technique. These results clearly demonstrate that Bisphenol A polyformal exhibits a very low level of miscibility with styrene/acrylonitrile copolymer (28% acrylonitrile) and therefore, does not act as a heat distortion builder for styrene/acrylonitrile copolymer as evidenced by essentially no increase in glass transition temperature (Tg) of the styrene/acrylonitrile copolymer.

EXAMPLE 3

A blend of 5 grams of the styrene/acrylonitrile copolymer (24% acrylonitrile) used in Comparative Example F and 5 grams of the TMBS/Bisphenol A polyformal described in Example 1 was prepared in methylene chloride. The resulting solution was clear and a thin film cast from the solution was transparent. The solution was then devolatilized in a vacuum oven and the resulting solid product was dried under vacuum at about 100° C. to constant weight. The solid product was then compression molded into a plaque in a 4 inch×4 inch×0.020 inch cavity mold at about 250° C. The resulting molded product exhibited obvious miscibility as evidenced by the fact that the molded product was transparent. The molded product was thereafter tested for miscibility by the resilience minimum technique using modulus-temperature data and resilience-temperature data as described in "Polymer-Polymer Miscibility", Olabisi et al., p. 122–126, Academic Press, New York, 1979. The modulus-temperature data and resilience-temperature data show that the molded product prepared from the blend of TMBS/Bisphenol A polyformal and styrene/acrylonitrile copolymer had a single glass transition temperature (Tg) of 115° C. The styrene/acrylonitrile copolymer had a glass transition temperature of 100° C. using the same resilience minimum technique. These results clearly demonstrate that TMBS/Bisphenol A polyformal is very miscible with styrene/acrylonitrile copolymer (24% acrylonitrile) and is an excellent heat distortion builder for styrene/acrylonitrile copolymer as evidenced by the increase in glass transition temperature (Tg) of the styrene/acrylonitrile copolymer. The resultant molded product was also tested for the mechanical properties described in Table I hereinbelow and the results of such testing are given in Table I.

EXAMPLE 4

A blend of 5 grams of the styrene/acrylonitrile copolymer (28% acrylonitrile) used in Comparative Example G and 5 grams of the TMBS/Bisphenol A polyformal described in Example 1 was prepared in methylene chloride. The resulting solution was clear and a thin film cast from the solution was transparent. The solution was then devolatilized in a vacuum oven and the resulting solid product was dried under vacuum at about 100° C. to constant weight. The solid product was then compression molded into a plaque in a 4 inch×4 inch×0.020 inch cavity mold at about 250° C. The resulting molded product exhibited obvious miscibility as evidenced by the fact that the molded product was transparent. The molded product was thereafter tested for miscibility by the resilience minimum technique using modulus-temperature data and resilience-temperature data as described in "Polymer-Polymer Miscibility", Olabisi et al., p. 122–126, Academic Press, New York, 1979. The modulus-temperature data and resilience-temperature data show that the molded product prepared from the blend of TMBS/Bisphenol A polyformal and styrene/acrylonitrile copolymer had a single glass transition temperature (Tg) of 120° C. The styrene/acrylonitrile copolymer had a glass transition temperature of 100° C. using the same resilience minimum technique. These results clearly demonstrate that TMBS/Bisphenol A polyformal is very miscible with styrene/acrylonitrile copolymer (28% acrylonitrile) and is an excellent heat distortion builder for styrene/a- crylonitrile copolymer as evidenced by the increase in glass transition temperature (Tg) of the styrene/acrylonitrile copolymer. The resultant molded product was also tested for the mechanical properties described in Table I hereinbelow and the results of such testing are given in Table I.

EXAMPLE 5

A blend of 5 grams of the poly(vinyl chloride) PVC commercially available from Union Carbide Corporation, Danbury, Conn. as QYSA used in Comparative Example H and 5 grams of the TMBS/Bisphenol A polyformal described in Example 1 was prepared in methylene chloride. The resulting solution was clear and a thin film cast from the solution was transparent. The solution was then devolatilized in a vacuum oven and the resulting solid product was dried under vacuum at about 100° C. to constant weight. The solid product was then compression molded into a plaque in a 4 inch×4 inch×0.020 inch cavity mold at about 250° C. The resulting molded product exhibited obvious miscibility as evidenced by the fact that the molded product was transparent. The molded product was thereafter tested for miscibility by the resilience minimum technique using modulus-temperature data and resilience-temperature data as described in "Polymer-Polymer Miscibility", Olabisi et al., p. 122–126, Academic Press, New York, 1979. The modulus-temperature data and resilience-temperature data show that the molded product prepared from the blend of TMBS/Bisphenol A polyformal and poly(vinyl chloride) PVC had a single glass transition temperature (Tg) of 115° C. The poly(vinyl chloride) PVC had a glass transition temperature of 80° C. using the same resilience minimum technique. These results clearly demonstrate that TMBS/Bisphenol A polyformal is very miscible with poly(vinyl chloride) PVC and is an excellent heat distortion builder for poly(vinyl chloride) PVC as evidenced by the increase in glass transition temperature (Tg) of the poly(vinyl chloride) PVC. The resultant molded product was also tested for the mechanical properties described in Table I hereinbelow and the results of such testing are given in Table I.

and from about 95 weight percent to about 5 weight percent of repeating units (II) having the formula

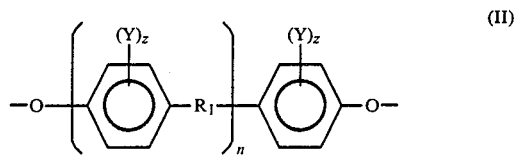
(II)

in which the repeating untis (I) and the repeating units (II) are connected by interbonding units (III) having the formula $$-CH_2- \tag{III}$$

wherein Y is selected from alkyl groups of 1 to 4 carbon atoms, chlorine or bromine, each z, independently, has a value of from 0 to 4 inclusive, n has a value of 0 or 1, and $R_1$ is a divalent saturated or unsaturated hydrocarbon radical, O, CO, $SO_2$, S or a direct bond, with the proviso that when $R_1$ is $SO_2$ then repeating unit (II) is not the same as repeating unit (I).

2. An aromatic polyformal as defined in claim 1 wherein the repeating units (II) have the formula

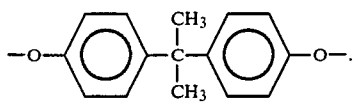

3. An aromatic polyformal as defined in claim 1 wherein the repeating units (II) have the formula

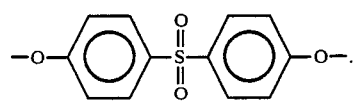

4. An aromatic polyformal as defined in claim 1 wherein the aromatic polyformal is terminated by end capping units (IV) having the formula

TABLE I

|  | MECHANICAL PROPERTIES | | | | | | | | |
|---|---|---|---|---|---|---|---|---|---|
|  | Examples and Comparative Examples | | | | | | | | |
| Mechanical Properties | D | E | 2 | F | G | H | 3 | 4 | 5 |
| 1% Secant Modulus (psi) | * | 265,000 | 274,000 | 302,000 | 471,000 | 299,000 | 309,000 | 342,000 | 283,000 |
| Tensile Strength (psi) | * | 5700 | 8910 | 8100 | 9900 | 7400 | 8225 | 7900 | 8500 |
| Elongation at Break (%) | * | 4–15 | 5 | 5 | 3.5 | 45 | 4 | 3.6 | 5.5 |
| Pendulum Impact Strength (ft. lbs./in.³) | * | 31–63 | 12 | 5 | 5 | 41 | 4.4 | 5.7 | 6 |

*No mechanical properties could be determined because of brittleness of molded product.

I claim:
1. An aromatic polyformal comprising from about 5 weight percent to about 95 weight percent of repeating units (I) having the formula

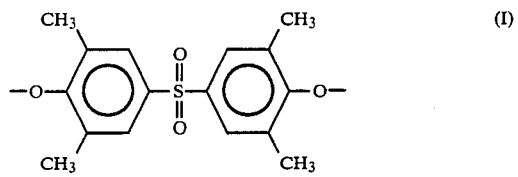
(I)

$$-OR_2 \tag{IV}$$

bonded to the interbonding units (III) and/or end capping units (V) having the formula $$-R_3 \tag{V}$$

bonded to the repeating units (I) and/or (II), wherein $R_2$ and $R_3$ are monovalent organic alkyl radicals having from 1 to about 10 carbon atoms, cycloalkyl having from about 5 to about 8 carbon atoms, aryl containing not more than about 3 aromatic rings, and $R_3$ can further be an alkyl acyl, cycloalkyl acyl, or aryl acyl radical.

5. A process for preparing aromatic polyformals comprising from about 5 weight percent to about 95 weight percent of repeating units (I) having the formula

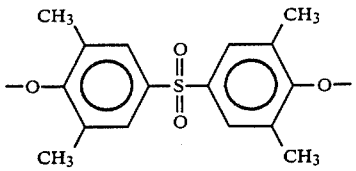 (I)

and from about 95 weight percent to about 5 weight percent of repeating units (II) having the formula

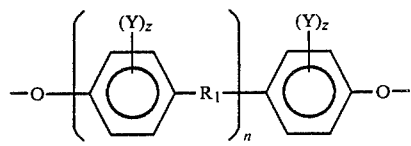 (II)

in which the repeating units (I) and the repeating units (II) are connected by interbonding units (III) having the formula

—CH$_2$— (III)

wherein Y is selected from alkyl groups of 1 to 4 carbon atoms, chlorine or bromine, each z, independently, has a value of from 0 to 4 inclusive, n has a value of 0 or 1, and R$_1$ is a divalent saturated or unsaturated hydrocarbon radical, O, CO, SO$_2$, S or a direct bond, with the proviso that when R$_1$ is SO$_2$ then repeating unit (II) is not the same as repeating unit (I), which process comprises reacting the alkali or alkaline earth metal salts of repeating unit (I) and repeating unit (II) with at least one dihalomethane compound in amounts sufficient to form the aromatic polyformal.

6. A process as defined in claim 5 wherein the repeating units (II) have the formula:

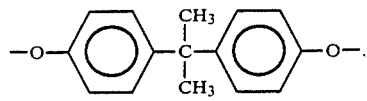

7. A process as defined in claim 5 wherein the repeating units (II) have the formula:

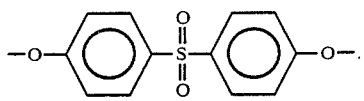

8. A process as defined in claim 5 which is carried out at elevated temperatures.

9. A process as defined in claim 5 wherein said reaction is carried out in a solvent.

10. A process as defined in claim 9 wherein the solvent is selected from dimethylsulfoxide, N-methyl-2-pyrrolidone dimethylformamide, dimethylacetamide, dimethyl sulfone, diphenylsulfone, sulfolane or diphenylether.

11. An aromatic polyformal prepared according to the process of claim 5.

12. A molded article prepared from the aromatic polyformal of claim 11.

13. A molded article prepared from the aromatic polyformal of claim 1.

14. A blend of an aromatic polyformal as defined in claim 1 and a poly(ester-carbonate).

15. A blend of an aromatic polyformal as defined in claim 1 and a polyester.

16. A blend of an aromatic polyformal as defined in claim 1 and a polysulfone.

17. A blend of an aromatic polyformal as defined in claim 1 and a polyarylate.

18. A blend of an aromatic polyformal as defined in claim 1 and a poly(ether imide).

19. A blend of an aromatic polyformal as defined in claim 1 and a styrenic polymer.

20. A blend of an aromatic polyformal as defined in claim 1 and a vinyl chloride containing polymer.

* * * * *